(12) United States Patent
Braden

(10) Patent No.: US 11,043,140 B1
(45) Date of Patent: Jun. 22, 2021

(54) FINANCIAL METHOD AND APPARATUS

(71) Applicant: Amanda M. Braden, Staten Island, NY (US)

(72) Inventor: Amanda M. Braden, Staten Island, NY (US)

( * ) Notice: Subject to any disclaimer, the term of this patent is extended or adjusted under 35 U.S.C. 154(b) by 0 days.

(21) Appl. No.: 17/155,233

(22) Filed: Jan. 22, 2021

(51) Int. Cl.
| | | |
|---|---|---|
| *G09B 19/00* | (2006.01) | |
| *G09B 1/04* | (2006.01) | |
| *G09B 23/02* | (2006.01) | |
| *G09B 19/02* | (2006.01) | |
| *A63F 9/00* | (2006.01) | |
| *A63H 33/08* | (2006.01) | |
| *A63F 3/00* | (2006.01) | |

(52) U.S. Cl.
CPC .............. *G09B 19/00* (2013.01); *G09B 1/04* (2013.01); *G09B 19/02* (2013.01); *G09B 23/02* (2013.01); *A63F 3/00574* (2013.01); *A63F 9/00* (2013.01); *A63H 33/08* (2013.01)

(58) Field of Classification Search
None
See application file for complete search history.

(56) References Cited

U.S. PATENT DOCUMENTS

2017/0197140 A1* 7/2017 Greenawalt ......... A63F 3/00574

OTHER PUBLICATIONS

"Teaching the Values of Coins", Teaching Children Mathematics, Jan. 1999, The National Council of Teachers of Mathematics, Inc. www.nctm.org, Drum, Randell, pp. 264-268.

* cited by examiner

*Primary Examiner* — James B Hull
(74) *Attorney, Agent, or Firm* — Walter J. Tencza, Jr.

(57) ABSTRACT

An apparatus, method, and/or system for teaching the value of monetary coins including first, second, third, and fourth bases, each having a plurality of recesses, and first, second, third and fourth inserts, each having at least one protrusion for inserting into a corresponding recess of one or more of the first, second, third, and fourth bases. The first, second, third, and fourth bases may be provided in one kit or as part of one overall apparatus, wherein the first base has only one hundred recesses, the second base has only twenty-five recesses, the third base has only ten recesses, and the fourth base has only five recesses. The first, second, third, and fourth inserts may be configured to cover twenty-five, ten, five, and one recesses, respectively to represent twenty five cents, ten cents, five cents, and one cent of a U.S. dollar.

6 Claims, 20 Drawing Sheets

FINANCIAL METHOD AND APPARATUS

FIELD OF THE INVENTION

This invention relates to financial methods and apparatuses for educational games.

BACKGROUND OF THE INVENTION

There are various financial games known in the art. There are various known ways of teaching children the monetary values of coins. In an article titled "Teaching the Values of Coins" in "Teaching Children Mathematics", Copyright 1999, Randell Drum, The National Council of Teachers of Mathematics, Inc., www.nctm.org., the technique of placing one coin model (such as a nickel model) over another coin model (such as a model for cents) is disclosed. However, the coin models disclosed are two dimensional flat diagrams on a paper, and have a tendency to slide with respect to each other.

SUMMARY OF THE INVENTION

In at least one embodiment, an apparatus, method, and/or system for teaching the value of monetary coins is provided.

In at least one embodiment, an apparatus is provided comprising: a first base having a plurality of recesses; and a first insert having a first portion and a second portion; wherein the first portion of the first insert is configured to be inserted into a first recess of the plurality of recesses of the first base; and wherein while the first portion of the first insert is inserted into the first recess of the first base, the second portion of the first insert is configured to cover a first section of the first base.

The plurality of recesses of the first base may include only one hundred recesses, wherein each of the plurality of recesses is substantially the same size as each of the other recesses of the plurality of recesses of the first base. The first portion of the first insert may be configured to be inserted into any one of the one hundred recesses.

In at least one embodiment, the plurality of recesses may include only twenty-five recesses, wherein each of the plurality of recesses is substantially the same size as each of the other recesses of the plurality of recesses; and wherein the first portion of the first insert is configured to be inserted into any one of the twenty-five recesses.

In at least one embodiment, the plurality of recesses of the first base may include only ten recesses, wherein each of the plurality of recesses is substantially the same size as each of the other recesses of the plurality of recesses; and wherein the first portion of the first insert is configured to be inserted into any one of the ten recesses.

In at least one embodiment, the plurality of recesses of the first base may include only five recesses, wherein each of the plurality of recesses is substantially the same size as each of the other recesses of the plurality of recesses; and wherein the first portion of the first insert is configured to be inserted into any one of the five recesses.

Alternatively, first, second, third, and fourth bases may be provided in one kit or as part of one overall apparatus, wherein the first base has only one hundred recesses, the second base has only twenty-five recesses, the third base has only ten recesses, and the fourth base has only five recesses.

In the one hundred recess example for the first base, the plurality of recesses may be arranged in a ten by ten square matrix to represent one hundred cents in a United States dollar.

The first section of the first base may include one recess of the plurality of recesses, such that the second portion of the first insert is configured to cover one recess of the first base.

The first section of the first base may include five recesses of the plurality of recesses, such that the second portion of the first insert is configured to cover five recesses of the first base.

The first section of the first base may include ten recesses of the plurality of recesses, such that the second portion of the first insert is configured to cover ten recesses of the first base.

The first section of the first base may include twenty-five recesses of the plurality of recesses, such that the second portion of the first insert is configured to cover twenty-five recesses of the first base.

In at least one embodiment, a second insert; a third insert; and a fourth insert may be provided with the first insert as part of an overall apparatus or kit; wherein each of the second, third, and fourth bases include a plurality of recesses; wherein the first, second, third, and fourth bases have a different number of recesses; wherein the second insert has one or more protrusions which are configured to be inserted into corresponding recesses of each of the first, second, third, and fourth bases; wherein the third insert has one or more protrusions which are configured to be inserted into corresponding recesses of each of the first, second, third, and fourth bases; and wherein the fourth insert has one or more protrusions which are configured to be inserted into corresponding recesses of each of the first, second, third, and fourth bases.

In at least one embodiment, each of the first, second, third, and fourth inserts has indicia shown thereon which indicate a particular U.S. coin represented, such that each of the first, second, third, and fourth inserts indicates a different monetary amount for each of the other of the first, second, third, and fourth inserts.

In at least one embodiment, a method is provided which may include inserting a first portion of a first insert into a first recess of a plurality of recesses of a first base, such that a second portion of the first insert covers one or more recesses of the plurality of recesses of the first base; and wherein the first insert has indicia indicating a particular U.S. coin and/or a monetary amount.

The method may further include inserting a first portion of a second insert into a second recess of the plurality of recesses of the first base, while the first portion of the first insert is inserted in the first recess of the first base, such that a second portion of the second insert covers one or more recesses of the plurality of recesses of the first base; and wherein the second insert has indicia indicating a particular U.S. coin and/or monetary amount which is different from the particular U.S. coin and/or monetary amount indicated by the first insert.

The method may further include inserting a first portion of a third insert into a third recess of the plurality of recesses of the first base, while the first portion of the first insert is inserted in the first recess of the first base, and while the first portion of the second insert is inserted in the second recess of the first base, such that a second portion of the third insert covers one or more recesses of the plurality of recesses of the first base; and wherein the third insert has indicia indicating a U.S. coin and/or monetary amount which is different from the U.S. coins and/or monetary amounts indicated by the first and the second inserts.

The method may further include inserting a first portion of a fourth insert into a fourth recess of the plurality of recesses of the first base, while the first portion of the first insert is inserted in the first recess of the first base, while the first portion of the second insert is inserted in the second recess of the first base, while the first portion of the third insert is inserted in the third recess of the first base, such that a second portion of the fourth insert covers one or more recesses of the plurality of recesses of the first base; and wherein the fourth insert has indicia indicating a U.S. coin and/or monetary amount which is different from the U.S. coin and/or monetary amounts indicated by the first, second, and the third inserts.

The method may further include removing the first portion of the first insert from the first recess of the first base; and inserting the first portion of the first insert into a first recess of a plurality of recesses of a second base, such that the second portion of the first insert covers one or more recesses of the plurality of recesses of the second base; and wherein the second base has a different number of recesses from the first base.

The method may further include removing the first portion of the first insert from the first recess of the second base; and inserting the first portion of the first insert into a first recess of a plurality of recesses of a third base, such that the second portion of the first insert covers one or more recesses of the plurality of recesses of the third base; and wherein the third base has a different number of recesses from the first base and the second base.

The method may further include removing the first portion of the first insert from the first recess of the third base; and inserting the first portion of the first insert into a first recess of a plurality of recesses of a fourth base, such that the second portion of the first insert covers one or more recesses of the plurality of recesses of the fourth base; and wherein the fourth base has a different number of recesses from the first base, the second base, and the third base.

In at least one embodiment, the first base only has one hundred recesses; the second base only has twenty-five recesses; the third base only has ten recesses; and the fourth base only has five recesses.

DETAILED DESCRIPTION OF THE DRAWINGS

Figure 1A:
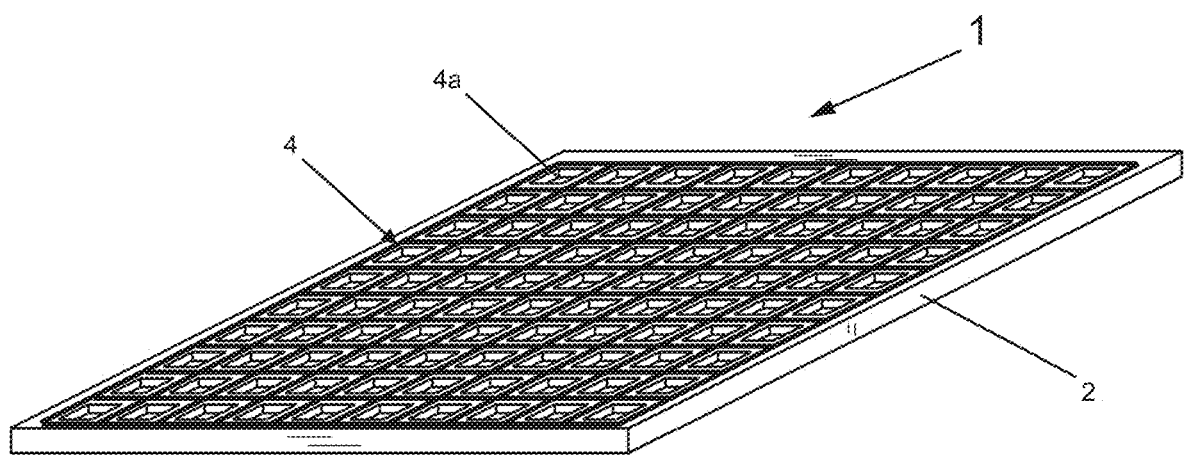
FIG. 1A shows a top, front, and right perspective view of a first base in accordance with an embodiment of the present invention.
Figure 1B:
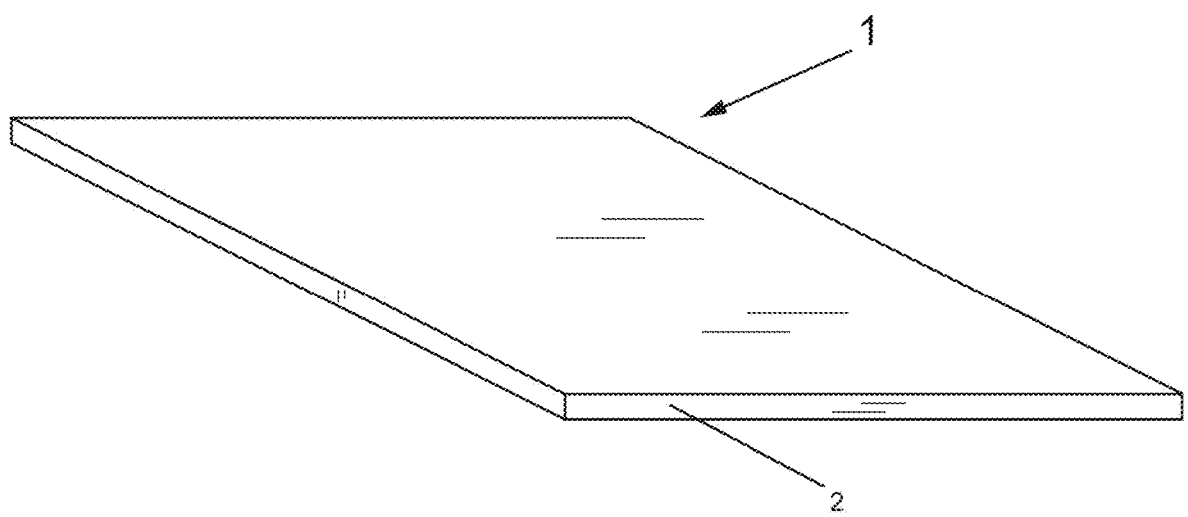
FIG. 1B shows a bottom, rear, and left perspective view of the first base of FIG. 1A.

FIG. 1A shows a top, front, and right perspective view of a first base 1 in accordance with an embodiment of the present invention. FIG. 1B shows a bottom, rear, and left perspective view of the first base 1 of FIG. 1A.

The first base 1 may have a solid body 2, in which are located a plurality of indentations 4, including indentation 4a shown in FIG. 1A. In at least one embodiment, the first base 1 may have one hundred indentations 4, in a matrix of ten rows by ten columns, which corresponds to one hundred cents in a U.S. dollar. The solid body 2 may have an overall square perimeter shape or outline. Each of the indentations or recesses 4 may be square shaped and each may have the same volume, size, and/or area.

The top surface of the first base 1, as shown in FIG. 1A, may include a grid pattern of lines, with eleven rows of lines and eleven columns of lines, which form a grid of rectangular spaces, wherein each indentation of indentations 4 is centered in a square grid section, bordered on four sides of each square section by lines.

Figure 2A:
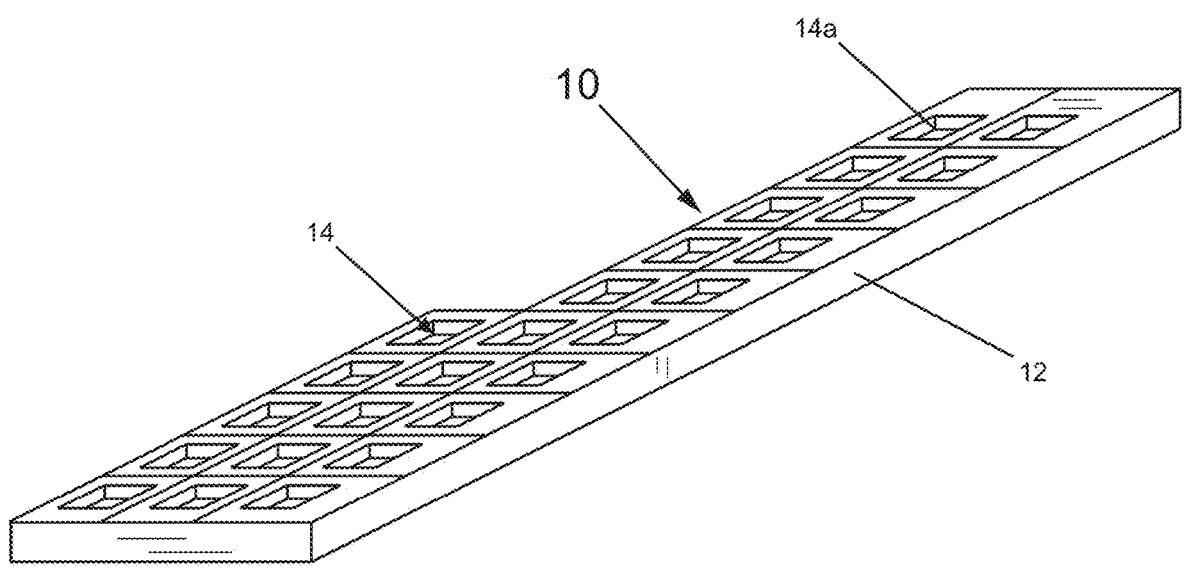
FIG. 2A shows a top, front, and right perspective view of a second base in accordance with an embodiment of the present invention.
Figure 2B:
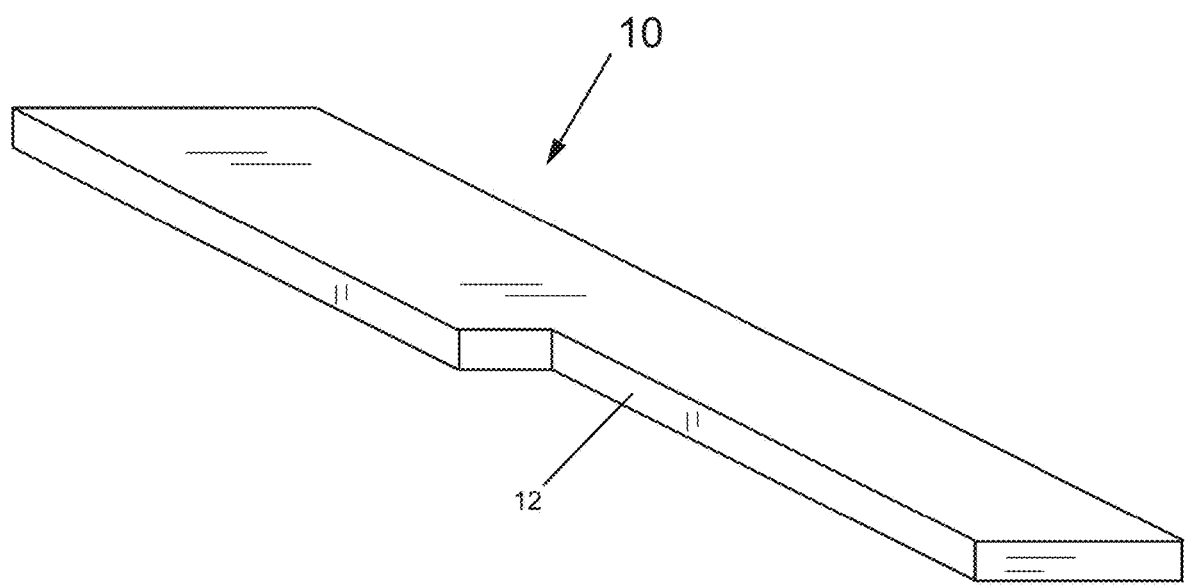
FIG. 2B shows a bottom, rear, and left perspective view of the second base of FIG. 2A.

FIG. 2A shows a top, front, and right perspective view of a second base 10 in accordance with an embodiment of the present invention. FIG. 2B shows a bottom, rear, and left perspective view of the second base 10 of FIG. 2A The second base 10 may have a solid body 12, in which are located a plurality of indentations or recesses 14 including recess 14a. In at least one embodiment, the second base 10 may have twenty-five indentations 14, where there are three columns, with two columns having ten recesses each, and one column having five recesses, for a total of twenty-five indentations or recesses, which corresponds twenty-five cents in a U.S. quarter. The solid body 12 may be described as comprised of first and second rectangular shapes integrated together, with the first rectangular shape having a three by five matrix of recesses of recesses 14 and the second rectangular shape having a two by five matrix of recesses 14. Each of the indentations or recesses 14 may be square shaped and each may have the same volume, size, and/or area, and each may have the same volume, size, and/or area as each of the recesses 4 of the first base 1.

The top surface of the second base 10, as shown in FIG. 2A, may include a grid pattern of lines, with four columns of lines and six rows of lines in the wider rectangular section, and three columns of lines and six rows of lines (including the line which is used in both the wider rectangular section and the narrower rectangular section) eleven columns of lines, which form grids of rectangular spaces, wherein each indentation of indentations 14 is centered in a square grid section, bordered on four sides of each square section by lines.

Figure 3A:
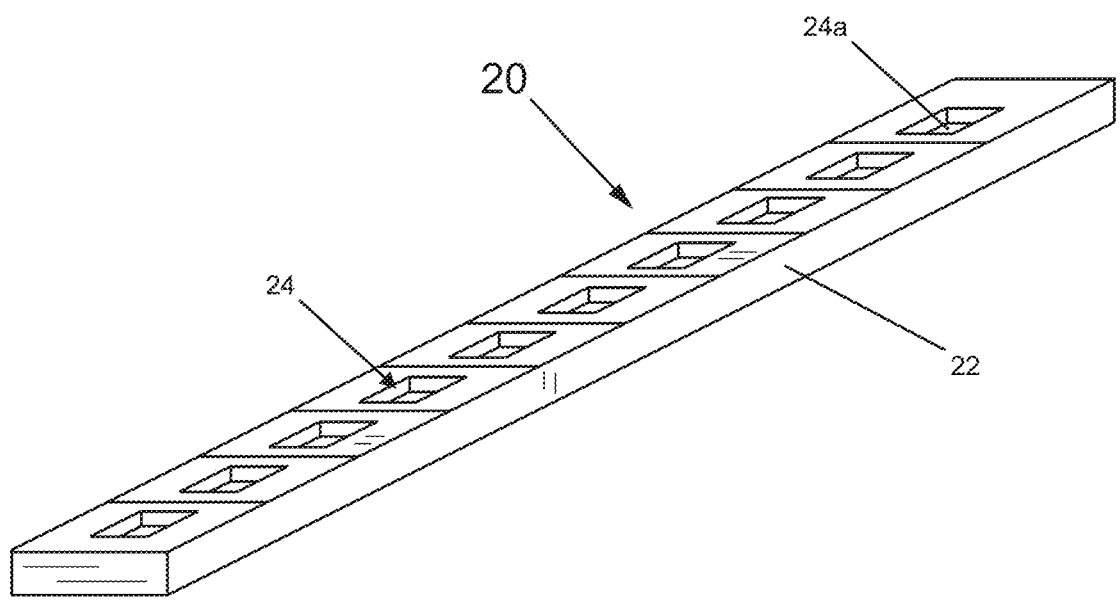
FIG. 3A shows a top, front, and right perspective view of a third base in accordance with an embodiment of the present invention.
Figure 3B:
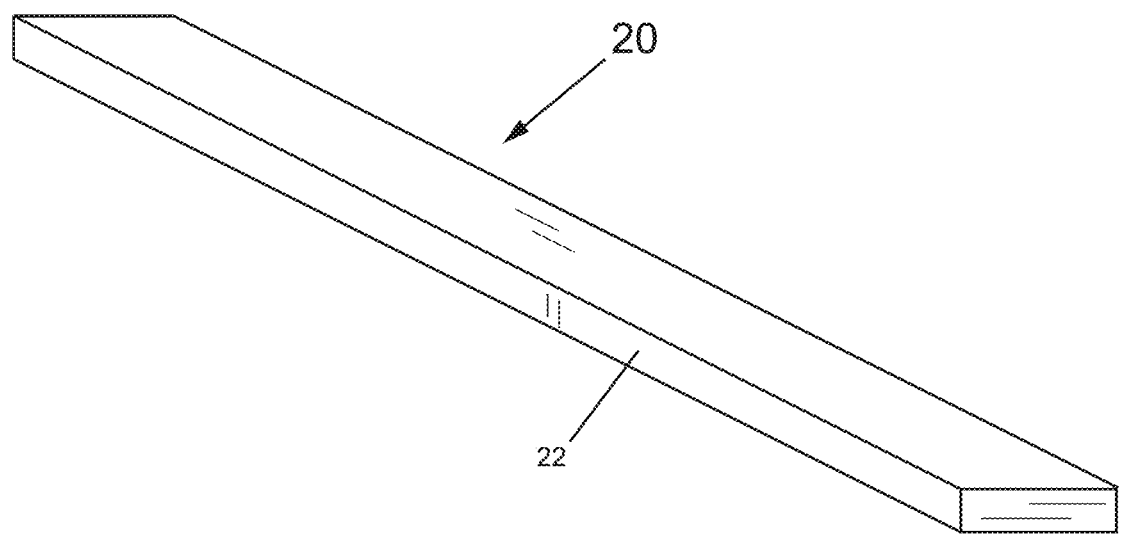
FIG. 3B shows a bottom, rear, and left perspective view of the third base of FIG. 3A.

FIG. 3A shows a top, front, and right perspective view of a third base 20 in accordance with an embodiment of the present invention. FIG. 3B shows a bottom, rear, and left perspective view of the third base 20 of FIG. 3A.

The third base 20 may have a solid body 22, in which are located a plurality of indentations or recesses 24 including recess 24a. In at least one embodiment, the third base 20 may have ten indentations 24, where there is one column of ten recesses, which corresponds to ten cents in a U.S. dime. The solid body 22 may be described as having a rectangular and/or elongated outer shape. Each of the indentations or recesses 24 may be square shaped and each may have the same volume, size, and/or area, and each may have the same volume, size, and/or area as each of the recesses 4 of the first base 1 and each of the recesses 14 of the second base 10.

The top surface of the third base 20 has eleven rows of lines and two columns of lines forming a ten by one grid of square spaces, where each of the recesses 24 is centered in a square space of the ten by one grid of square spaces.

Figure 4A:
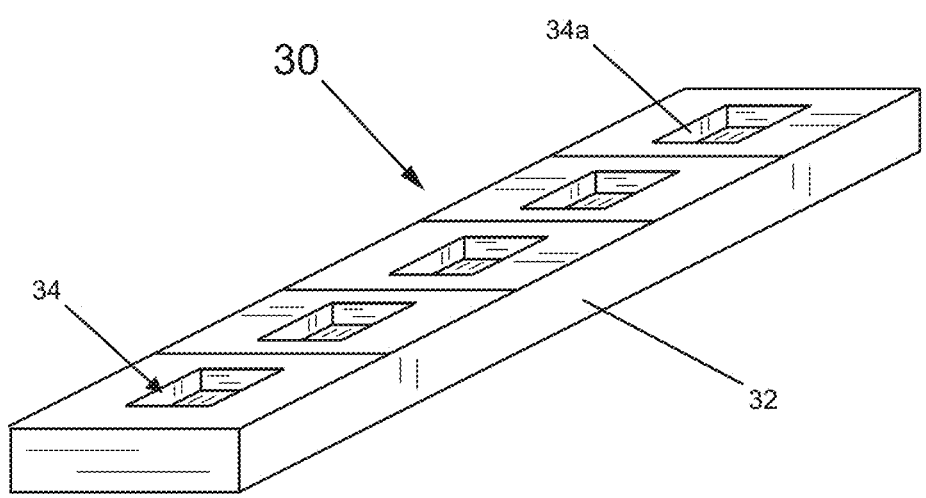
FIG. 4A shows a top, front, and right perspective view of a fourth base in accordance with an embodiment of the present invention.
Figure 4B:
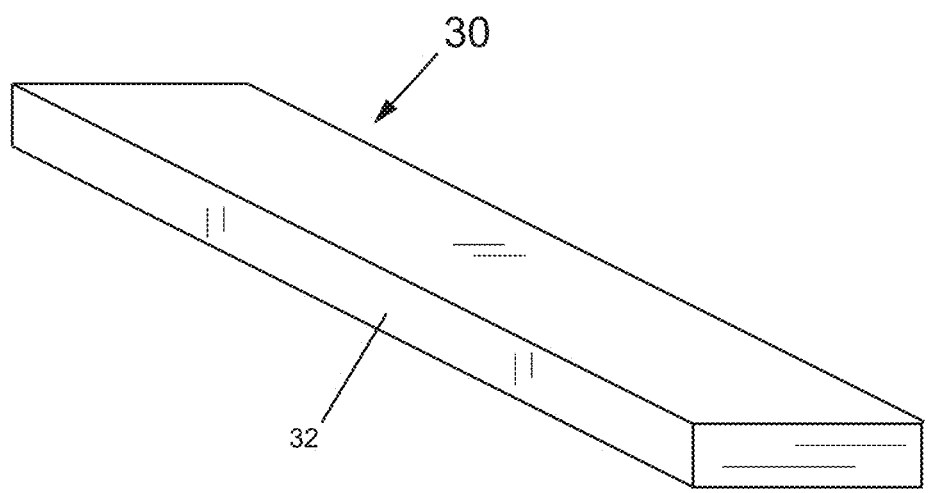
FIG. 4B shows a bottom, rear, and left perspective view of the fourth base of FIG. 4A.

FIG. 4A shows a top, front, and right perspective view of a fourth base 30 in accordance with an embodiment of the present invention. FIG. 4B shows a bottom, rear, and left perspective view of the fourth base 30 of FIG. 4A.

The fourth base 30 may have a solid body 32, in which are located a plurality of indentations or recesses 34 including recess 34a. In at least one embodiment, the third base 30 may have five indentations 34, where there is one column of five recesses, which corresponds to five cents in a U.S. nickel. The solid body 32 may be described as having a rectangular and/or elongated outer shape. Each of the indentations or recesses 34 may be square shaped and each may have the same volume, size, and/or area, and each may have the same volume, size, and/or area as each of the recesses 4 of the first base 1, each of the recesses 14 of the second base 10, and each of the recesses 24 of the third base 20.

The top surface of the fourth base 30 has six rows of lines and two columns of lines forming a five by one grid of square spaces, where each of the recesses 34 is centered in a square space of the five by one grid of square spaces.

Figure 5A:
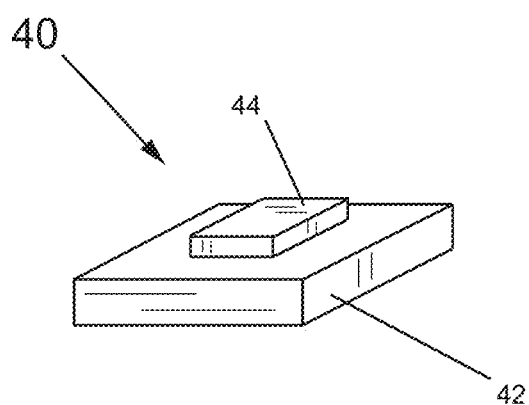
FIG. 5A shows a bottom, rear, and right perspective view of a first insert in accordance with an embodiment of the present invention.
Figure 5B:
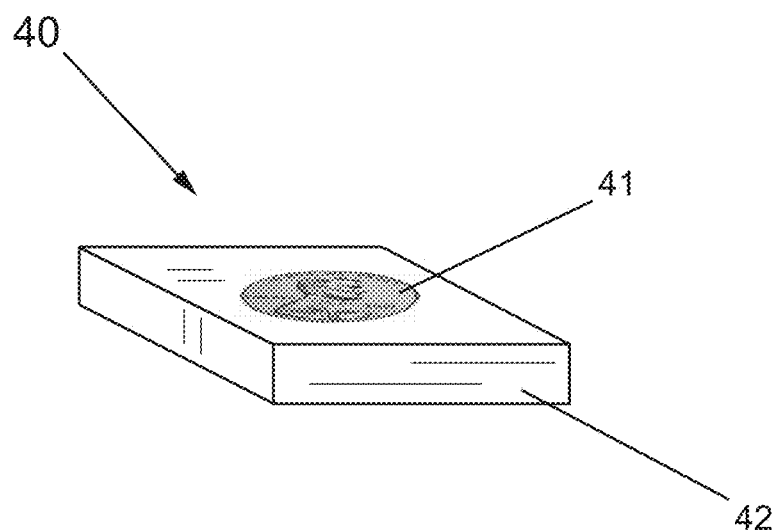
FIG. 5B shows a top, front, and left perspective view of the first insert of FIG. 5A.

FIG. 5A shows a bottom, rear, and right perspective view of a first insert or first device 40 in accordance with an embodiment of the present invention. FIG. 5B shows a top, front, and left perspective view of the first insert 40 of FIG. 5A.

The first insert 40 may be comprised of a solid cube and/or rectangular prism or block or first portion 42 and a solid cube and/or rectangular prism or block or second portion 44, which are integrated and/or attached to one another. The second portion 44 may also be referred to as a protrusion and/or as protruding from the first portion 42.

In FIG. 5B, the top surface of the first portion 42 of the first insert 40 has an indication, graphic, or symbol 41, such as in FIG. 5B the head of a United States (U.S.) penny. The indication or symbol may be or may be replaced by the indication, graphic, or symbol to indicate a value of "1" or "1 cent".

In FIG. 5B there is a one by one grid shown, denoting a quantity and/or value of one.

Figure 6A:
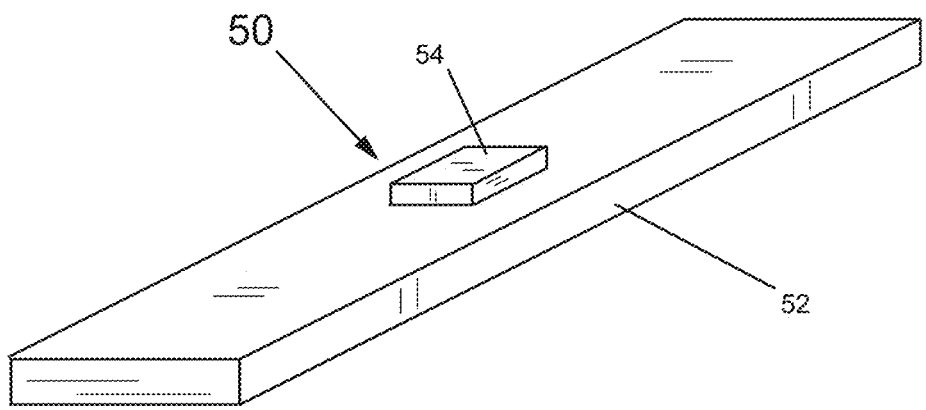
FIG. 6A shows a bottom, rear, and right perspective view of a second insert in accordance with an embodiment of the present invention.
Figure 6B:
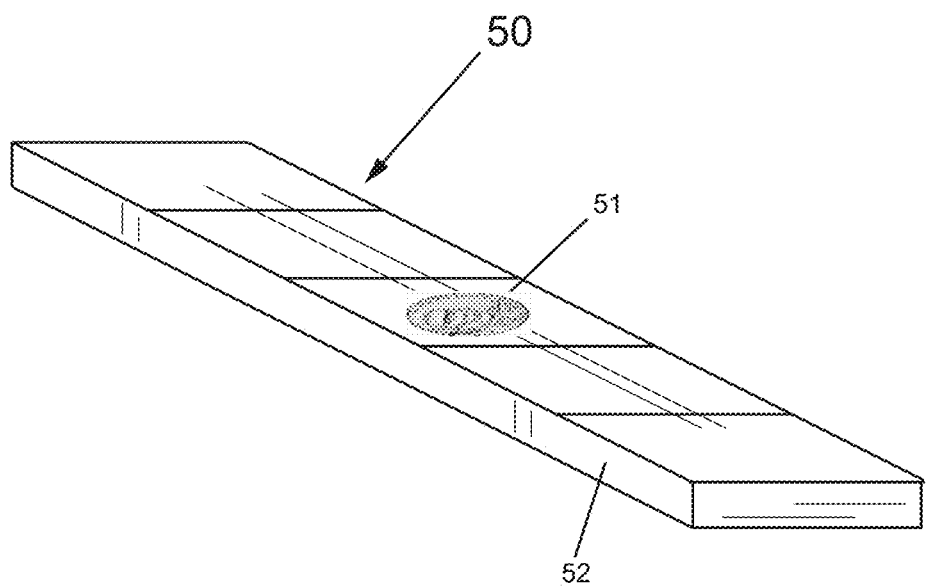
FIG. 6B shows a top, front, and left perspective view of the second insert of FIG. 6A.

FIG. 6A shows a bottom, rear, and right perspective view of a second insert or second device 50 in accordance with an embodiment of the present invention. FIG. 6B shows a top, front, and left perspective view of the second insert 50 of FIG. 6A.

The second insert 50 may be comprised of a solid cube and/or rectangular prism or block or first portion 52 and a solid cube and/or rectangular prism or block or second portion 54, which are integrated and/or attached to one another. The second portion 54 may also be referred to as a protrusion and/or as protruding from the first portion 52.

In FIG. 6B, the top surface of the first portion 52 of the second insert 50 has an indication, graphic, or symbol 51, such as in FIG. 6B, the head of a U.S. nickel. The indication or symbol may be or may be replaced by an indication, graphic, or symbol to indicate a value of "5" or "5 cents".

In FIG. 6B, there is a five by one grid of square spaces, with each space being the same size, on the top surface of the second insert 50, denoting a quantity and/or value of five.

Figure 7A:
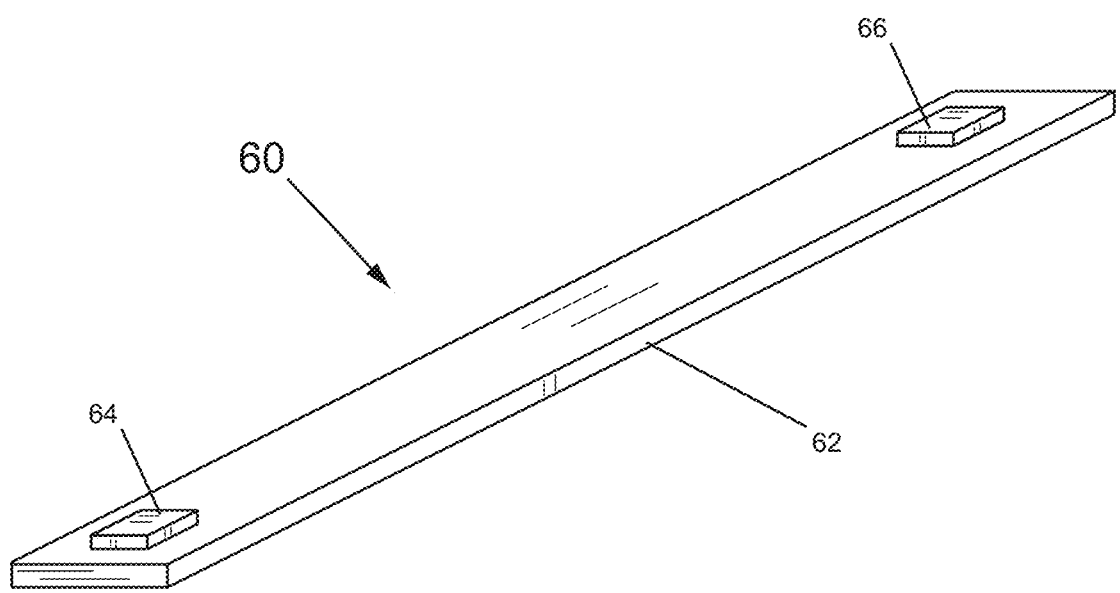
FIG. 7A shows a bottom, rear, and right perspective view of a third insert in accordance with an embodiment of the present invention.
Figure 7B:
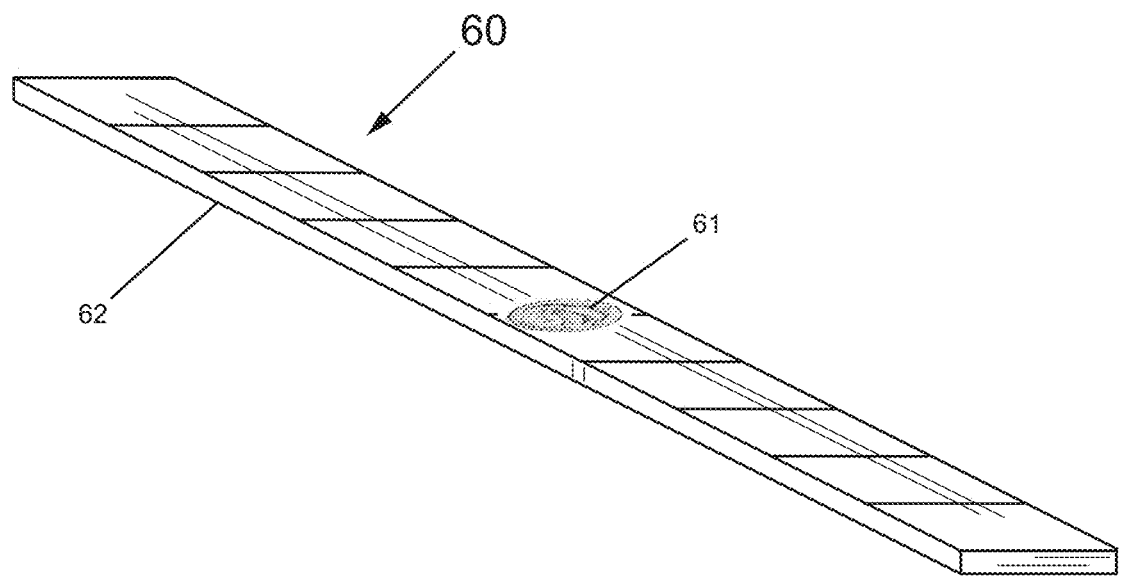
FIG. 7B shows a top, front, and left perspective view of the third insert of FIG. 7A.

FIG. 7A shows a bottom, rear, and right perspective view of a third insert 60 in accordance with an embodiment of the present invention. FIG. 7B shows a top, front, and left perspective view of the third insert 60 of FIG. 7A.

The third insert 60 may be comprised of a solid cube and/or rectangular prism or block or first portion 62 and solid cubes and/or rectangular prisms or blocks or second and third portions 64 and 66, respectively, which are integrated and/or attached to the first portion 62. The second and third portions, 64 and 66, respectively, may also be referred to as protrusions and/or as protruding from the first portion 62.

In FIG. 7B, the top surface of the first portion 62 of the third insert 60 has an indication, graphic, or symbol 61, such as in FIG. 7B, the head of a U.S. dime. The indication or symbol may be or may be replaced by an indication, graphic, or symbol to indicate a value of "10" or "10 cents".

In FIG. 7B, there is a ten by one grid of square spaces, with each space being the same size, on the top surface of the third insert 60, denoting a quantity and/or value of ten.

Figure 8A:
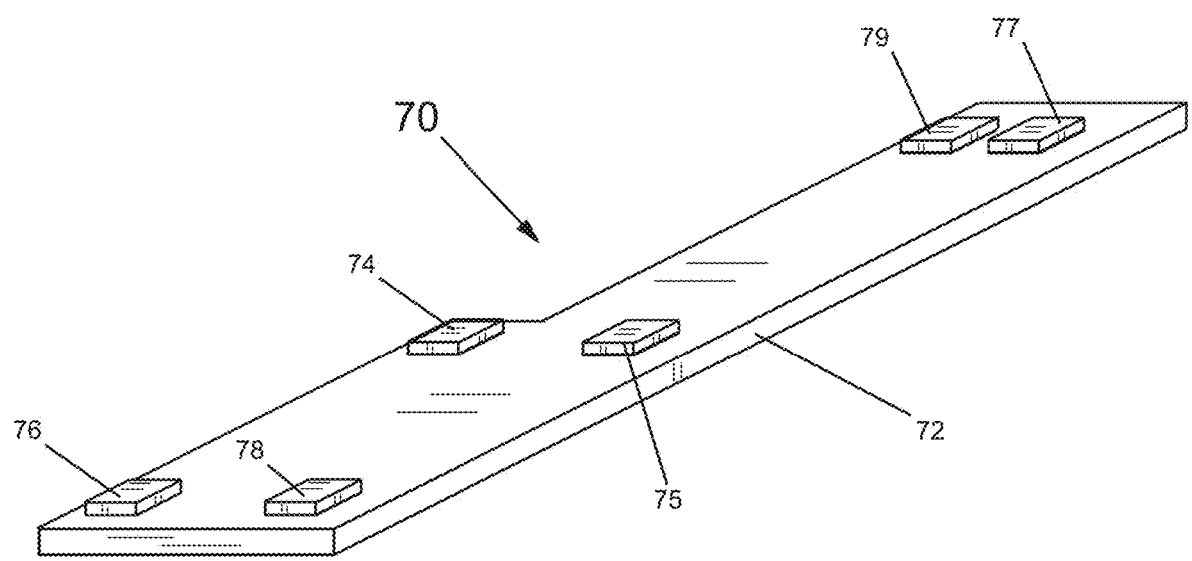
FIG. 8A shows a bottom, rear, and right perspective view of a fourth insert in accordance with an embodiment of the present invention.
Figure 8B:
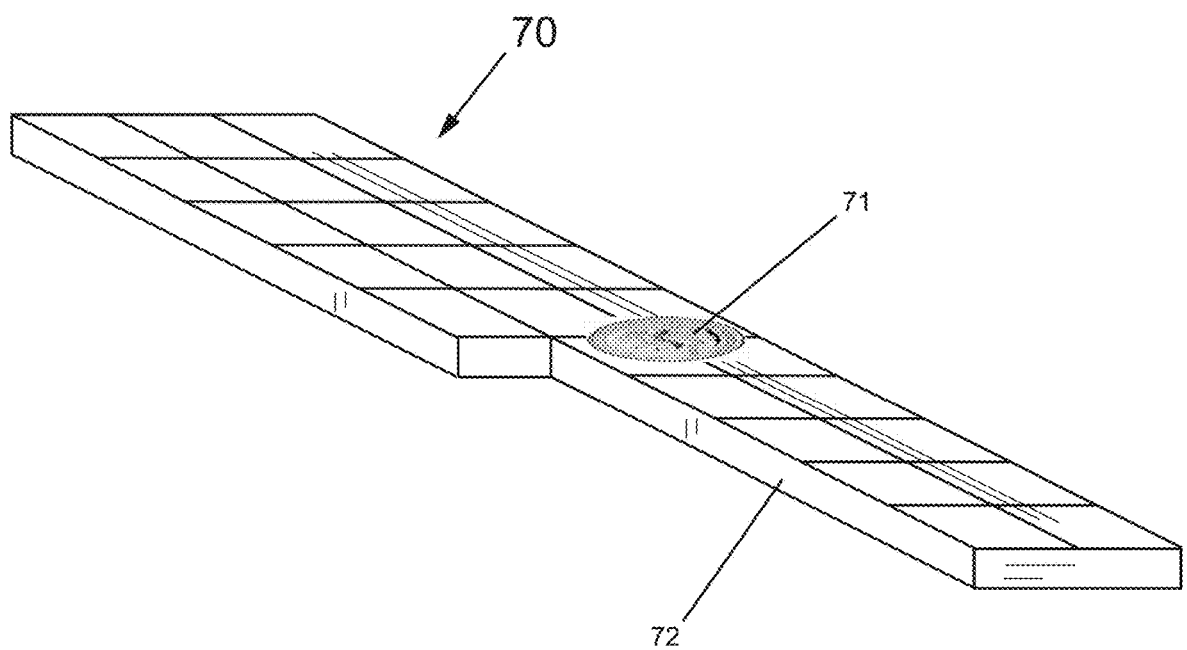
FIG. 8B shows a top, front, and left perspective view of the fourth insert of FIG. 8A.

FIG. 8A shows a bottom, rear, and right perspective view of a fourth insert 70 in accordance with an embodiment of the present invention. FIG. 8B shows a top, front, and left perspective view of the fourth insert 70 of FIG. 8A.

The fourth insert 70 may be described as being comprised two solid cubes and/or rectangular prisms or blocks integrated together, i.e. one being wider than the other to make up solid portion 72. The fourth insert 70 further includes solid cubes and/or rectangular prisms or blocks or second, third, fourth, fifth, sixth, and seventh portions 74, 75, 76, 77, 78, and 79, respectively, which are integrated and/or attached to the first portion 72. The second, third, fourth, fifth, sixth and seventh portions, 74, 75, 76, 77, 78, and 79, respectively, may also be referred to as protrusions and/or as protruding from the first portion 72.

In FIG. 8B, the top surface of the first portion 72 of the fourth insert 70 has an indication, graphic, or symbol 71, such as in FIG. 8B, the head of a U.S. quarter coin. The indication or symbol may be or may be replaced by an indication, graphic, or symbol to indicate a value of "25" or "25 cents".

In FIG. 8B, there is a first rectangular grid of three by five square spaces and a second rectangular grid of two by ten square spaces, with each space being the same size, on the top surface of the fourth insert 70, denoting a quantity and/or value of twenty-five.

Figure 9:
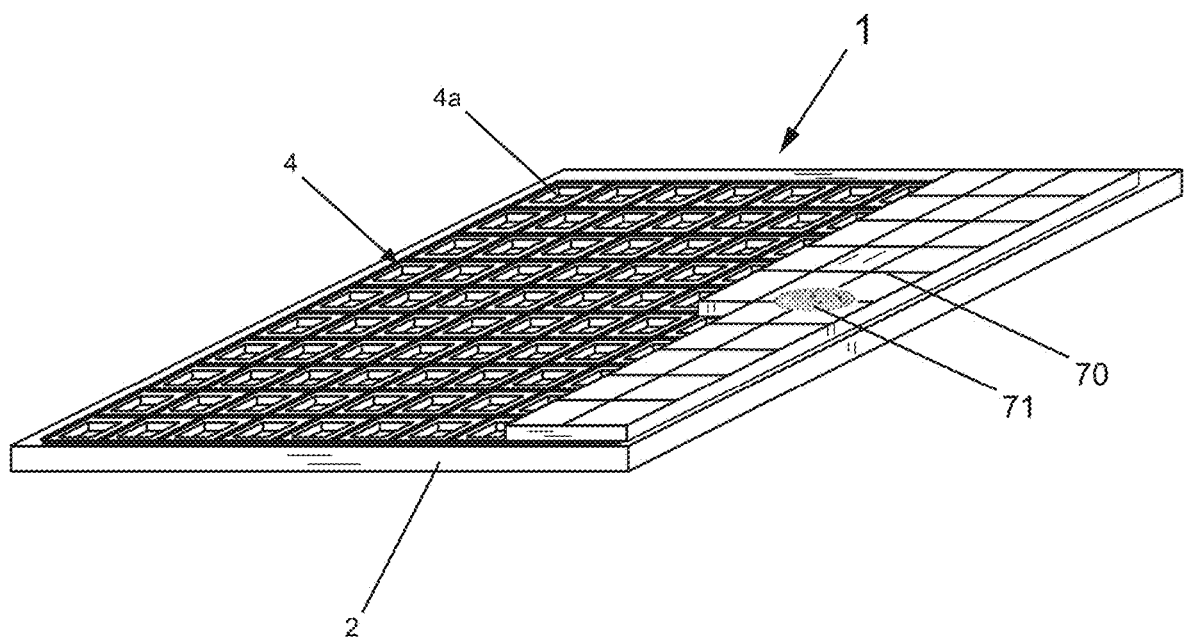
FIG. 9 shows a top, front, and right perspective view of the fourth insert of FIG. 8A and the first base of FIG. 1A, with protrusions of the fourth insert, inserted into corresponding recesses or indentations of the first base of FIG. 1A.

FIG. 9 shows a top, front, and right perspective view of the fourth insert 70 of FIG. 8A and the first base 1 of FIG. 1A, with protrusions 74, 75, 76, 77, 78, and 79 (not shown) of the fourth insert 70, inserted into corresponding recesses or indentations of indentations 4 of the first base 1 of FIG. 1A. The fourth insert 70 is shown having a top surface grid of two column by ten rows, and one column by five rows, for a total of twenty-five rectangular top surface spaces. The fourth insert 70 also has a symbol or indicia of a U.S. quarter coin, which indicates that it represents a U.S. quarter. The symbol, graphic, or indicia may be or may be replaced by the image of "25" within a circle. In FIG. 9, twenty-five of the one hundred indentations 4 of the base 1 are covered, overlapped, or substantially covered or overlapped by the fourth insert 70, and seventy-five of the one hundred indentations 4 of the base 1 are not covered by the fourth insert 70. The protrusions 74, 75, 76, 77, 78, and 79 (not shown in FIG. 9), are located inside of corresponding indentations of indentations 4 so that the fourth insert 70 does not slide or does not slide substantially parallel to the base 1 or body 2, because the protrusions 74, 75, 76, 77, 78, and 79 do not slide or do no slide substantially in their respective recesses. In addition, the meshing of the rectangular block protrusions 74, 75, 76, 77, 78, and 79 with the corresponding rectangular indentations is preferred so that the fourth insert 70 will not rotate with respect to the first base 1, in FIG. 9. The protrusions 74, 75, 76, 77, 78, and 79 should be configured to mesh closely with the respective indentations 4, i.e. each of the protrusions 74, 75, 76, 77, 78, and 79 should have a size, area and/or volume which is about the same as or slightly less than the size, area, or volume of each of the indentations 4. The protrusions 74, 75, 76, 77, 78, and 79 are also located in appropriate indentations of indentations 4 so that the fourth insert 70 covers two columnsxten rows and a third column by five rows for a total of twenty-five spaces.

Figure 10:
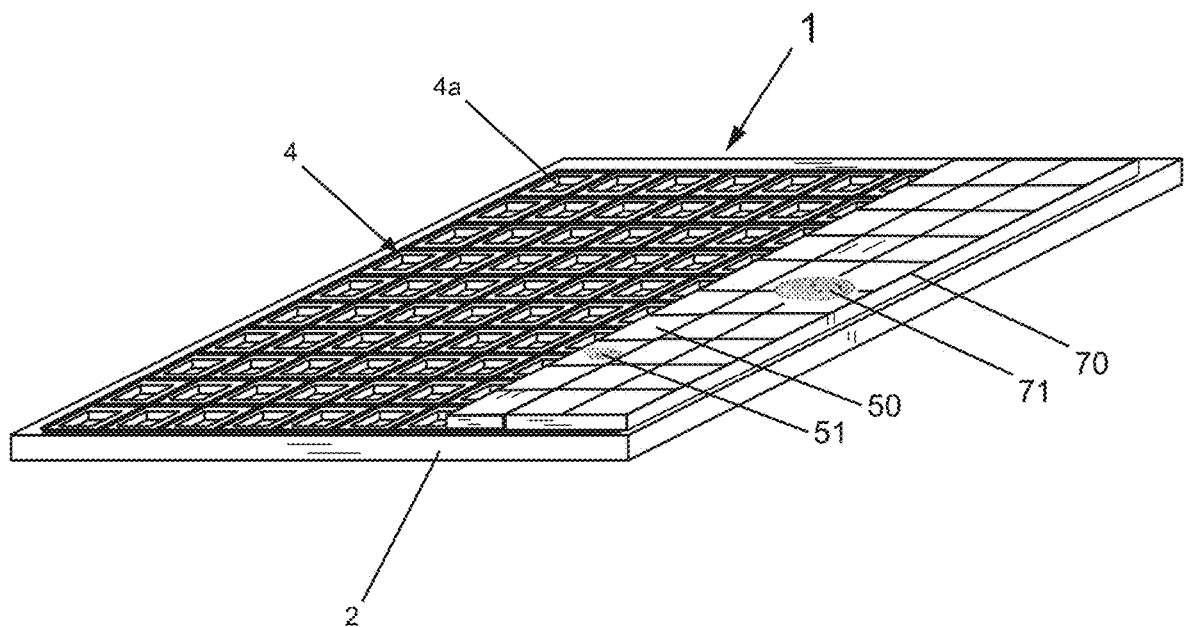
FIG. 10 shows a top, front, and right perspective view of the second insert of FIG. 6A, the fourth insert of FIG. 8A, and the first base of FIG. 1A, with a protrusion of the second insert, inserted into a corresponding recess or indentation of the first base of FIG. 1A, and with protrusions of the fourth insert of FIG. 8A inserted into corresponding recesses or indentations of the first base of FIG. 1A.

FIG. 10 shows a top, front, and right perspective view of the second insert 50 of FIG. 6A, the fourth insert 70 of FIG. 8A, and the first base 1 of FIG. 1A, with a protrusion 54 (not shown in FIG. 10) of the second insert 50, inserted into a corresponding recess or indentation of the first base 1 of FIG. 1A, and with protrusions 74, 76, 78, and 79 (not shown in FIG. 10) of the fourth insert 70 of FIG. 8A inserted into corresponding recesses or indentations of the first base 1 of FIG. 1. The second insert 50 is shown having a top surface grid of one column by five rows for a total of five rectangular top surface spaces, indicating a value of five. The second insert 50 also has a symbol or indicia of a U.S. nickel coin, which indicates that it represents a U.S. nickel coin. The symbol or indicia may be or may be replaced by an image of "5" within a circle. In FIG. 10, five of the one hundred indentations 4 of the base 1 are covered, overlapped, or substantially covered or overlapped by the second insert 50, twenty-five of the indentations of indentations 4 are covered, overlapped, or substantially covered or overlapped by the fourth insert 70; and seventy of the one hundred indentations 4 of the base 1 are not covered by either the fourth insert 70 or the second insert 50. The protrusion 54 (not shown in FIG. 10) is located inside of a corresponding indentation of indentations 4 so that the second insert 50 does not slide or does not slide substantially parallel to the base 1 or body 2, because the protrusion 54 does not slide or does not slide substantially in its respective recess of recesses 4. In addition, the meshing of the rectangular block protrusion 54 with the corresponding rectangular indentation is preferred so that the second insert 50 will not rotate with respect to the first base 1, in FIG. 9. The protrusion 54 should be configured to mesh closely with the respective indentation of indentations 4, i.e. each the protrusion 54 should have a size, area and/or volume which is about the same as or slightly less than the size, area, or volume of each of the indentations 4. FIG. 10 represents thirty cents or thirty spaces or indentations of indentations 4 covered.

Figure 11:
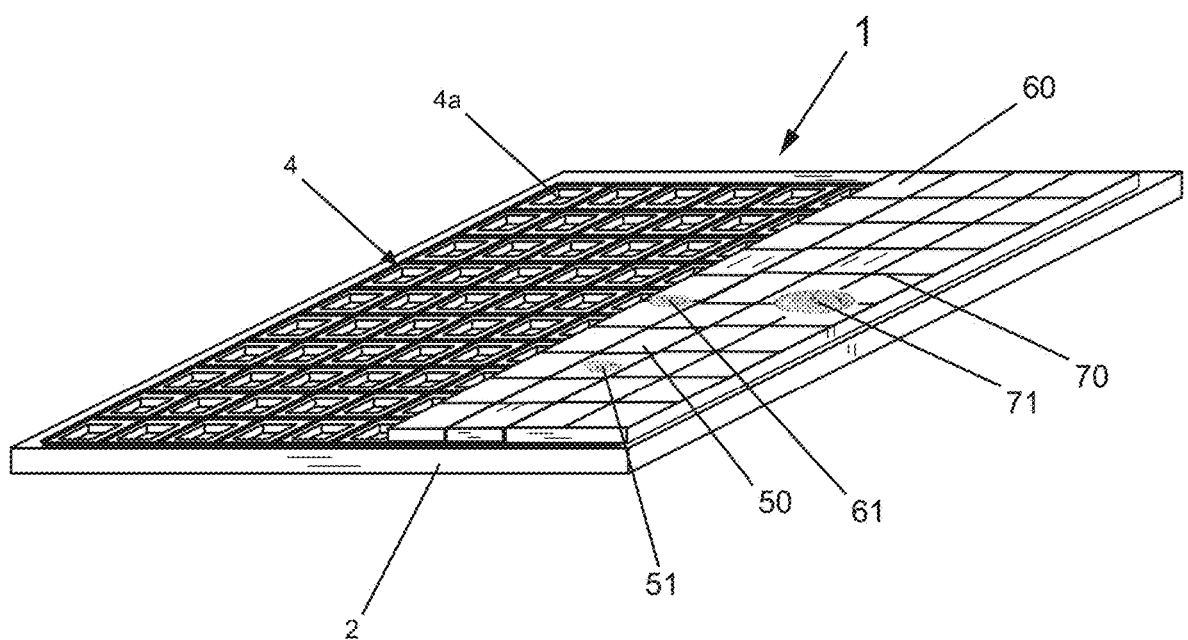
FIG. 11 shows a top, front, and right perspective view of the second insert of FIG. 6A, the third insert of FIG. 7A, the fourth insert of FIG. 8A, and the first base of FIG. 1A, with a protrusion of the second insert, inserted into a corresponding recess or indentation of the first base of FIG. 1A, with protrusions of the fourth insert of FIG. 8A inserted into corresponding recesses or indentations of the first base of FIG. 1A; and with protrusions of the third insert of FIG. 7A inserted into corresponding recesses or indentations of the first base of FIG. 1A.

FIG. 11 shows a top, front, and right perspective view of the second insert 50 of FIG. 6A, the third insert 60 of FIG. 7A, the fourth insert 70 of FIG. 8A, and the first base of FIG. 1A, with a protrusion 54 of the second insert 50, inserted into a corresponding recess or indentation of the first base 1 of FIG. 1A, with protrusions 74, 75, 76, 77, 78, and 79 of the fourth insert 70 of FIG. 8 inserted into corresponding recesses or indentations of the first base 1 of FIG. 1A; and with protrusions 64 and 66 of the third insert 60 of FIG. 7A inserted into corresponding recesses or indentations of indentations 4 of the first base 1 of FIG. 1A. The third insert 60 is shown having a top surface grid of one column by ten rows for a total of ten rectangular top surface spaces. The third insert 60 also has a symbol or indicia of a head of a U.S. dime coin, which indicates that it represents a U.S. dime. The symbol or indicia may be or may be replaced by the the image of "10" within a circle.

In FIG. 11, five of the one hundred indentations 4 of the base 1 are covered, overlapped, or substantially covered or overlapped by the second insert 50, ten of the one hundred indentations 4 of the base 1 are covered, overlapped, or substantially covered or overlapped by the third insert 60, and twenty-five of the indentations of indentations 4 are covered, overlapped, or substantially covered or overlapped by the fourth insert 70; and sixty of the one hundred indentations 4 of the base 1 are not covered by either the fourth insert 70, the second insert 50, or the third insert 60. The protrusions 64 and 66 (not shown in FIG. 11) are located inside of corresponding indentations of indentations 4 so that the third insert 60 does not slide or does not slide substantially parallel to the base 1 or body 2, because the protrusions 64 and 66 do not slide or do not slide substantially in their respective recesses of recesses 4. In addition, the meshing of the rectangular block protrusions 64 and 66 with the corresponding rectangular indentation is preferred so that the second insert 60 will not rotate with respect to the first base 1, in FIG. 9. The protrusions 64 and 66 should be configured to mesh closely with the respective indentations of indentations 4, i.e. each the protrusions 64 should have a size, area and/or volume which is about the same as or slightly less than the size, area, or volume of each of the indentations 4. FIG. 11 represents forty cents or forty spaces or indentations of indentations 4 covered.

Figure 12:
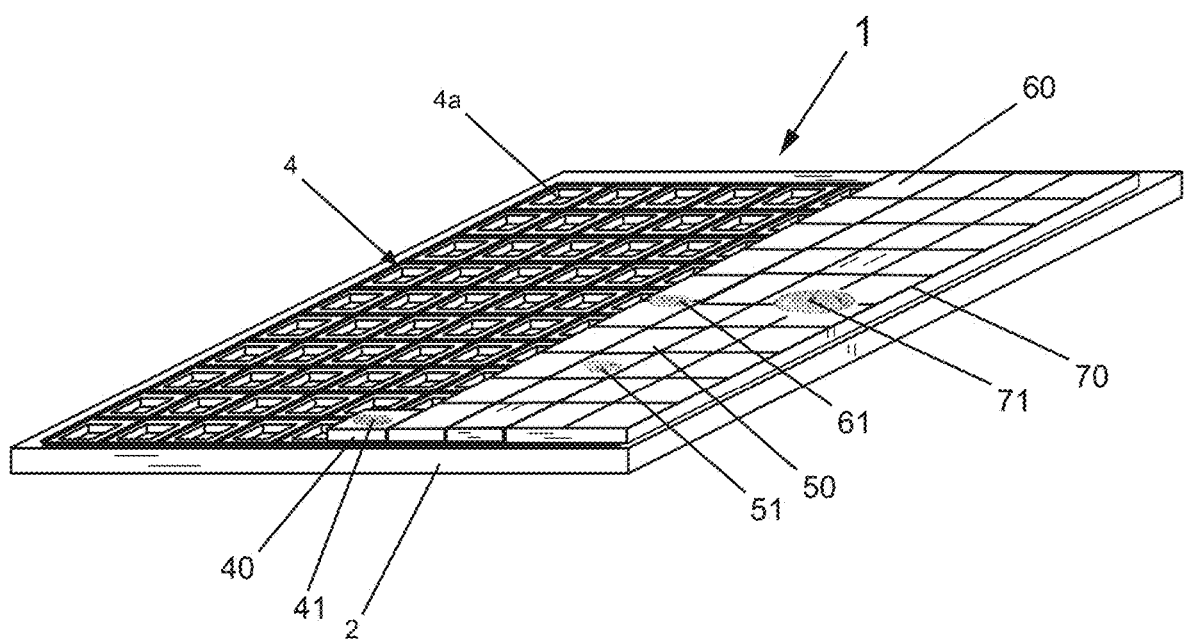
FIG. 12 shows a top, front, and right perspective view of the second insert of FIG. 6A, the third insert of FIG. 7A, the fourth insert of FIG. 8A, the first insert of FIG. 5A, and the base of FIG. 1A, with a protrusion of the second insert, inserted into a corresponding recess or indentation of the first base of FIG. 1A, with protrusions of the fourth insert of FIG. 8A inserted into corresponding recesses or indentations of the first base of FIG. 1A, with protrusions of the third insert of FIG. 7A inserted into corresponding recesses or indentations of the first base of FIG. 1A, and with a protrusion of the first insert of FIG. 5A inserted into a corresponding recess or indentation of the first base of FIG. 1A.

FIG. 12 shows a top, front, and right perspective view of the second insert 50 of FIG. 6A, the third insert 60 of FIG. 7A, the fourth insert 70 of FIG. 8A, the first insert 40 of FIG. 5A, and the first base 1 of FIG. 1A, with a protrusion 52 of the second insert 50, inserted into a corresponding recess or indentation of the first base 1, with protrusions 74, 75, 76, 77, 78, and 79 of the fourth insert 70 of FIG. 8A inserted into corresponding recesses or indentations of the first base 1 of FIG. 1A, with protrusions 64 and 66 of the third insert 60 of FIG. 7A inserted into corresponding recesses or indentations of the first base 1 of FIG. 1A, and with a protrusion 44 of the first insert 40 of FIG. 5 inserted into a corresponding recess or indentation of indentations 4 of the first base 1 of FIG. 1A.

The first insert 40 is shown having a top surface grid of one top surface space. The first insert 40 also has a symbol or indicia of a U.S. penny coin head, which indicates that it represents a U.S. penny. The symbol or indicia may be or may be replaced by an image of a "1" within a circle. In FIG. 12, five of the one hundred indentations 4 of the base 1 are covered, overlapped, or substantially covered or overlapped by the second insert 50, ten of the one hundred indentations 4 of the base 1 are covered, overlapped, or substantially covered or overlapped by the third insert 60, twenty-five of the indentations of indentations 4 are covered, overlapped, or substantially covered or overlapped by the fourth insert 70, one of the indentations of indentations 4 is covered, overlapped, or substantially covered or overlapped by the first insert 40; and fifty-nine of the one hundred indentations 4 of the base 1 are not covered by either the fourth insert 70, the second insert 50, the third insert 60, or the first insert 40. The protrusion 44 (not shown in FIG. 12) are located inside of corresponding indentations of indentations 4 so that the first insert 40 does not slide or does not slide substantially parallel to the base 1 or body 2, because the protrusion 44 does not slide or does not slide substantially in its respective recesses of recesses 4. In addition, the meshing of the rectangular block protrusion 44 with the corresponding rectangular indentation is preferred so that the first insert 40 will not rotate with respect to the first base 1, in FIG. 9. The protrusion 44 should be configured to mesh closely with the respective indentations of indentations 4, i.e. the protrusion 44 should have a size, area and/or volume which is about the same as or slightly less than the size, area, or volume of each of the indentations 4. FIG. 12 represents forty-one cents or forty-one spaces or indentations of indentations 4 covered.

In at least one embodiment, the second base 10 of FIGS. 2A-B may be used instead of the first base 1. For example, the protrusion 44 of the first insert 40 may be inserted into a recess of the recesses 14 of the second base 10 to cover the corresponding indentation of indentations 14, the protrusion 54 of the second insert 50 may be inserted into a recess of the recesses 14 of the second base 10 to cover five indentations of indentations 14 with second insert 50, and the protrusions 64 and 66 may be inserted into corresponding recesses of the recesses 14 of second base 10 to cover ten indentations with the third insert 60, to thereby represent sixteen cents inside of the second base 10. Alternatively, for example, the fourth insert 70 may have its protrusions inserted into corresponding indentations of the second base 10, so that all twenty-five indentations are covered by the twenty-five squares of the grid pattern of the fourth insert 70 shown in FIG. 8B.

Similarly, or identically, the third base 20 may be used by inserting protrusions of the third insert 60 to cover all ten recesses 24, or instead by inserting a combination of protrusions of two second inserts 50, or instead by inserting protrusions of one or more first inserts 40, to cover a corresponding number of recesses 24.

Similarly, or identically, the fourth base 30 may be used by inserting the protrusion 54 of the second insert 50 to cause insert 50 to cover all five recesses 34, or instead by inserting protrusions of one or more first inserts 40, to cover a corresponding number of recesses 34.

In at least one embodiment, it is critical that each square space on the top surfaces of first insert 40, the second insert 50, the third insert 60 and the fourth insert 70 be the same or substantially the same size as each square space in the grid patterns on the top surface of the first base 1, the second base 10, the third base 20, and the fourth base 30. In this manner, a square space of one or more inserts of inserts 40, 50, 60, and 70 is used to cover a corresponding square space of one or more bases of bases 1, 10, 20, and 30.

The inserts 40, 50, 60, 70, and bases 1, 10, 20, and 30 can be used to graphically teach children and others the monetary value of different types of coins.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:
1. An apparatus comprising:
a first base, a second base, a third base, and a fourth base, each having a plurality of recesses and each having a different number of recesses from the other;
a first insert, a second insert, a third insert, and a fourth insert, each having a first portion and a second portion;
wherein the first portion of each insert has one or more protrusions which are configured to be inserted into corresponding recesses of each of the first, second, third, and fourth bases;
wherein the second portion of the first insert is configured to cover one recess of either the first base, the second base, the third base, or the fourth base, when the first portion of the first insert is inserted into one recess of the first base, the second base, the third base or the fourth base;
wherein the second portion of the second insert is configured to cover five recesses of either the first base, the second base, the third base, or the fourth base, when the first portion of the second insert is inserted into at least one of five recesses of the first base, the second base, the third base, or the fourth base;
wherein the second portion of the third insert is configured to cover ten recesses of either the second base, the third base, or the fourth base, when the first portion of the third insert is inserted into at least one of ten recesses of the second base, the third base, or the fourth base;
wherein the second portion of the fourth insert is configured to cover twenty-five recesses of either the third base, or the fourth base, when the first portion of the fourth insert is inserted into at least one of twenty-five recesses of the third base or the fourth base;
wherein the first base has only five recesses;
wherein the second base has only ten recesses;
wherein the third base has only twenty-five recesses;
wherein the fourth base has only one hundred recesses;
wherein a top of the second portion of the first insert has indicia indicating a monetary value of one cent, wherein the top of the second portion of the first insert is opposite the first portion of the first insert;
wherein a top of the second portion of the second insert has indicia indicating a monetary value of five cents, wherein the top of the second portion of the second insert is opposite the first portion of the second insert;
wherein a top of the second portion of the third insert has indicia indicating a monetary value of ten cents, wherein the top of the second portion of the third insert is opposite the first portion of the third insert; and
wherein a top of the second portion of the fourth insert has indicia indicating a monetary value of twenty-five cents, wherein the top of the second portion of the fourth insert is opposite the first portion of the fourth insert.

2. The apparatus of claim 1 wherein
the plurality of recesses of the fourth base is arranged in a ten by ten square matrix.

3. The apparatus of claim 1
wherein the top of the second portion of the second insert has a grid with five.

4. The apparatus of claim 1 wherein
the top of the second portion of the second insert is covered by a grid of five spaces, wherein the five spaces of the grid of the second insert are configured to align with and overlap five consecutive recesses, respectively, of either the first base, the second base, the third base, or the fourth base;
wherein the top of the second portion of the first insert is covered by one space, wherein the one space of the first insert is configured to align with and overlap one recess of either the first base, the second base, the third base, or the fourth base;
wherein the top of the second portion of the third insert is covered by a grid of ten spaces, wherein the ten spaces of the grid of the third insert are configured to align with and overlap ten consecutive recesses, respectively, of either the second base, the third base, or the fourth base; and
wherein the top of the second portion of the fourth insert is covered by a grid of twenty-five spaces, wherein the twenty-five spaces of the grid of the fourth insert are configured to align with and overlap twenty-five recesses, respectively, of either the third base, or the fourth base.

5. A method of using an apparatus, wherein the apparatus is comprised of:
a first base, a second base, a third base, and a fourth base, each having a plurality of recesses being substantially the same size and each having a different number of recesses from the other;
a first insert, a second insert, a third insert, and a fourth insert, each having a first portion and a second portion;
wherein the first portion of each insert has one or more protrusions which are configured to be inserted into corresponding recesses of each of the first, second, third, and fourth bases;
wherein the second portion of the first insert is configured to cover one recess of either the first base, the second base, the third base, or the fourth base, when the first portion of the first insert is inserted into one recess of the first base, the second base, the third base or the fourth base;
wherein the second portion of the second insert is configured to cover five recesses of either the first base, the second base, the third base, or the fourth base, when the first portion of the second insert is inserted into at least one of five recesses of the first base, the second base, the third base, or the fourth base;
wherein the second portion of the third insert is configured to cover ten recesses of either the second base, the third base, or the fourth base, when the first portion of the third insert is inserted into at least one of ten recesses of the second base, the third base, or the fourth base;
wherein the second portion of the fourth insert is configured to cover twenty-five recesses of either the third base, or the fourth base, when the first portion of the fourth insert is inserted into at least one of twenty-five recesses of the third base or the fourth base;
wherein the first base has only five recesses;
wherein the second base has only ten recesses;
wherein the third base has only twenty-five recesses;
wherein the fourth base has only one hundred recesses;
wherein a top of the second portion of the first insert has indicia indicating a monetary value of one cent, wherein the top of the second portion of the first insert is opposite the first portion of the first insert;
wherein a top of the second portion of the second insert has indicia indicating a monetary value of five cents, wherein the top of the second portion of the second insert is opposite the first portion of the second insert;
wherein a top of the second portion of the third insert has indicia indicating a monetary value of ten cents, wherein the top of the second portion of the third insert is opposite the first portion of the third insert; and
wherein a top of the second portion of the fourth insert has indicia indicating a monetary value of twenty-five cents, wherein the top of the second portion of the fourth insert is opposite the first portion of the fourth insert;
the method comprising:
inserting at least one of the first portions of the first, second, third, or fourth insert into one of the first, second, third, or fourth base such that the one or more second portions of the at least one inserted insert covers a number of recesses of the base equal to the monetary value indicated on the top of the inserted insert.

6. The method of claim 5 further comprising
removing the inserted first portion of the first, second, third, or forth insert from the first, second, third, or fourth base, and inserting the removed first portion of the first, second, third or fourth insert into a first recess of a different base of the first, second, third or fourth base such that the second portion of the inserted insert covers a number of recesses of the base equal to the monetary value indicated on the top of the inserted insert.

* * * * *